United States Patent
Shintaku et al.

(10) Patent No.: US 12,061,134 B2
(45) Date of Patent: Aug. 13, 2024

(54) PIPELINE INSPECTION METHOD FOR CARRYING OUT AN AIRTIGHTNESS INSPECTION ON A CONDUIT

(71) Applicant: NIPPON TELEGRAPH AND TELEPHONE CORPORATION, Tokyo (JP)

(72) Inventors: Masashi Shintaku, Musashino (JP); Yoshihiro Iriyama, Musashino (JP); Norihiro Fujimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 267 days.

(21) Appl. No.: 17/597,337

(22) PCT Filed: Jul. 10, 2019

(86) PCT No.: PCT/JP2019/027404
§ 371 (c)(1),
(2) Date: Jan. 4, 2022

(87) PCT Pub. No.: WO2021/005761
PCT Pub. Date: Jan. 14, 2021

(65) Prior Publication Data
US 2022/0268660 A1 Aug. 25, 2022

(51) Int. Cl.
*G01M 3/28* (2006.01)
(52) U.S. Cl.
CPC ............................... *G01M 3/2807* (2013.01)

(58) Field of Classification Search
CPC .................................................. G01M 3/2807
See application file for complete search history.

(56) References Cited

U.S. PATENT DOCUMENTS

| | | | | |
|---|---|---|---|---|
| 4,373,381 A | * | 2/1983 | Kulp | ........... B67D 7/3209 73/40.5 R |
| 2006/0091876 A1 | * | 5/2006 | Davila | ............... G01M 3/40 324/71.1 |

(Continued)

FOREIGN PATENT DOCUMENTS

| JP | H109273975 A | 10/1997 |
|---|---|---|
| JP | 2002257713 A | 9/2002 |

OTHER PUBLICATIONS

Sep. 10, 2019, International Search Report issued in the International Patent Application No. PCT/JP2019/027404.

(Continued)

*Primary Examiner* — Eric S. McCall
(74) *Attorney, Agent, or Firm* — XSENSUS LLP

(57) ABSTRACT

A conduit inspection method includes a first specifying step (S1) of specifying, as a normal section of a conduit, a section from a first end (Pa) of the conduit that is connected to one manhole to a first position (P1) in the conduit at which airtightness can be confirmed, a second specifying step (S1) of specifying, as a normal section of the conduit, a section from a second end (Pb) of the conduit that is connected to another manhole to a second position (P2) in the conduit at which airtightness can be confirmed, and a third specifying step (S3) of specifying a section from the first position (P1) to the second position (P2) as an abnormal section of the conduit.

18 Claims, 11 Drawing Sheets

(56) References Cited

U.S. PATENT DOCUMENTS

2022/0163441 A1* 5/2022 Fujimoto ............. G01N 17/006
2022/0244130 A1* 8/2022 Shintaku ............. G01M 3/2815

OTHER PUBLICATIONS www.ntt.co.jp, Published in 2006, from URL: http://www.ntt.co.jp/journal/0603/files/jn200603047.pdf Shigeru Yamaguchi, et al., "Inspection diagnosis and repair/regeneration technology for pipeline equipment", NTT Technical Journal, 2006, 9 pages.

* cited by examiner

PIPELINE INSPECTION METHOD FOR CARRYING OUT AN AIRTIGHTNESS INSPECTION ON A CONDUIT

TECHNICAL FIELD

The present disclosure relates to a conduit inspection method.

BACKGROUND ART

The maintenance and management technology for inspecting and diagnosing the state of deterioration over time of underground conduit (communication conduit) equipment that accommodates communication cables and repairing and regenerate the equipment in a timely manner is indispensable for improving the responsiveness of optical services and extending the life of the equipment over the long term (e.g., see NPL 1).

FIG. 7 is a diagram showing an example of a conduit inspection method described in NPL 1. For example, when a communication cable is newly laid in a vacant conduit, an operator inserts a pipe camera 63 into a communication conduit 62 from a manhole 61, and inspects whether the communication conduit 62 is sound by visually checking a captured image. If the operator confirms that the communication conduit is normal, the communication cable is laid in the communication conduit, and if the operator finds damage (e.g., a hole) in the communication conduit, the entire communication conduit is repaired by means of a lining technology or the like.

CITATION LIST

Non Patent Literature

[NPL 1] Yamaguchi et al., "Inspection-Diagnosis and Repair-Regeneration Technology for Conduit Equipment", NTT Technical Journal 2006.3, P47-50, [online], [Retrieved on Jul. 4, 2019], Internet <URL: http://www.n-tt.co.jp/journal/0603/files/jn200603047.pdf>

SUMMARY OF THE INVENTION

Technical Problem

However, with the conventional conduit inspection method, it is difficult to simply and accurately specify a section in which a conduit needs to be repaired. For this reason, if the operator confirms that a conduit is partially damaged, the operator cannot check a minute abnormality that is not visible, and therefore the entire conduit needs to be repaired, which is costly.

An object of the present disclosure that has been made in view of the foregoing circumstances is to provide a conduit inspection method that makes it possible to simply and accurately specify a section in which a conduit needs to be repaired.

Means for Solving the Problem

To solve the above problem, a conduit inspection method according to the present disclosure is a conduit inspection method for inspecting a conduit with two ends connected to respective manholes, and the method includes: a first specifying step of specifying, as a normal section of the conduit, a section from a first end of the conduit that is connected to one of the manholes to a first position in the conduit at which airtightness can be confirmed; a second specifying step of specifying, as a normal section of the conduit, a section from a second end of the conduit that is connected to another one of the manholes to a second position in the conduit at which airtightness can be confirmed; and a third specifying step of specifying a section from the first position to the second position as an abnormal section of the conduit.

Effects of the Invention

According to the present disclosure, a section in which a conduit needs to be repaired can be specified simply and accurately.

DESCRIPTION OF EMBODIMENTS

Hereinafter, an embodiment of the present disclosure will be described in detail with reference to the drawings.

<Conduit Inspection Method>

An example of the conduit inspection method according to an embodiment of the present disclosure will be described with reference to FIGS. 1 to 6.

The conduit inspection method according to the present embodiment includes a first specifying step (step S1), a second specifying step (step S2), and a third specifying step (step S3).

Figure 1A:
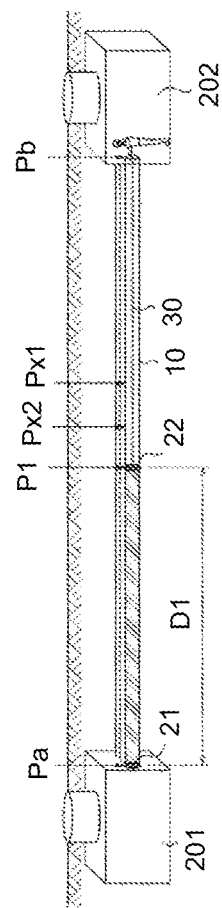
FIG. 1A is a diagram showing an example of a conceptual diagram of a conduit inspection method according to an embodiment.

Step S1: As shown in FIG. 1A, an operator specifies, as a normal section of the conduit 10, a section from a first end Pa of a conduit 10 that is connected to a manhole 201 to a position P1 (first position) in the conduit 10 at which airtightness can be confirmed. The airtightness level is preset by the operator. A detailed description of an airtightness test will be given later with reference to FIG. 6.

Specifically, the operator closes the first end Pa of the conduit 10 using a stop valve 21 (first stop valve). The stop valve 21 need only be configured to be able to close the first end Pa of the conduit 10, and may be a known stop valve. Next, the operator inserts a stop valve 22 (second stop valve) into the conduit 10 from a second end Pb of the conduit 10. The stop valve 22 need only be configured to be able to close or open a predetermined position (first predetermined position) in the conduit 10 and move within the conduit 10. One example of the configuration of the stop valve 22 will be described later with reference to FIGS. 2 to 4.

Next, the operator attaches a rod 30 to the stop valve 22 as shown in FIG. 3, and inserts the stop valve 22 to a predetermined position in the conduit 10 while pushing the rod 30 from the second end Pb of the conduit 10 toward the first end Pa of the conduit 10. Next, the operator closes the predetermined position in the conduit 10 using the stop valve 22. Next, the operator conducts the airtightness test in the section from the first end Pa of the conduit 10 to the predetermined position in the conduit 10, and determines whether or not airtightness can be confirmed in this section. Note that although the operator may gradually push the stop valve 22 forward from the second end Pb of the conduit 10 and conduct the airtightness test, if, for example, a hole or the like in the conduit 10 can be clearly confirmed, the airtightness test may be conducted after pushing the stop valve 22 forward at a time to a position beyond the hole portion in the conduit 10.

If, for example, the operator determines that airtightness cannot be confirmed in the section from the first end Pa of the conduit 10 to the position Px1 in the conduit 10, the operator moves the stop valve 22 from the position Px1 in the conduit 10 to a position Px2 in the conduit 10 while pushing the rod 30 from the second end Pb of the conduit 10 toward the first end Pa of the conduit 10. Next, the operator closes the position Px2 in the conduit 10 using the stop valve 22. Next, the operator conducts the airtightness test in a section from the first end Pa of the conduit 10 to the position Px2 in the conduit 10, and determines whether or not airtightness can be confirmed in this section. The operator repeatedly moves the stop valve 22 and conducts the airtightness test until it is determined that airtightness can be confirmed in a section from the first end Pa of the conduit 10 to a predetermined position in the conduit 10.

If, for example, the operator determines that airtightness can be confirmed in a section from the first end Pa of the conduit 10 to the position P1 in the conduit 10, the operator measures the distance D1 from the first end Pa of the conduit 10 to the position P1 in the conduit 10. Next, the operator determines the position P1 that is distant from the first end Pa of the conduit 10 by the distance D1 as a position at which airtightness can be confirmed. That is to say, the operator specifies, as a normal section of the conduit 10, the section from the first end Pa of the conduit 10 to the position P1 in the conduit 10 that corresponds to the distance D1, as indicated by a hatched portion in FIG. 1A. Next, the operator removes the stop valve 22 from the second end Pb of the conduit 10.

As described above, the operator temporarily opens or closes a predetermined position in the conduit 10 and repeats the airtightness test while moving the stop valve 22 from the second end Pb of the conduit 10 toward the first end Pa of the conduit 10, and accurately specifies the normal section of the conduit 10.

Figure 1B:
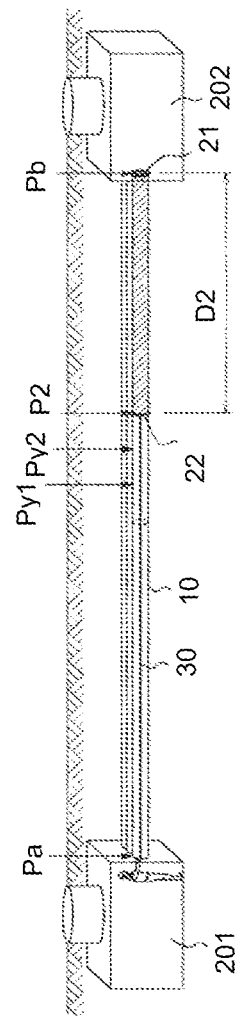
FIG. 1B is a diagram showing an example of a conceptual diagram of the conduit inspection method according to an embodiment.

Step S2: As shown in FIG. 1B, the operator specifies, as a normal section of the conduit 10, a section from the second end Pb of the conduit 10 that is connected to the manhole 202 to a position P2 (second position) in the conduit 10 at which airtightness can be confirmed. The airtightness level is preset by the operator. A detailed description of the airtightness test will be given later with reference to FIG. 6.

Specifically, the operator closes the second end Pb of the conduit 10 using the stop valve 21. The stop valve 21 need only be configured to be able to close the second end Pb of the conduit 10, and may be a known stop valve. Next, the operator inserts the stop valve 22 into the conduit 10 from the first end Pa of the conduit 10. The stop valve 22 need only be configured to be able to close or open a predetermined position (second predetermined position) in the conduit 10 and move within the conduit 10. One example of the configuration of the stop valve 22 will be described later with reference to FIGS. 2 to 4.

Next, the operator attaches the rod 30 to the stop valve 22 as shown in FIG. 3, and inserts the stop valve 22 to a predetermined position in the conduit 10 while pushing the rod 30 from the first end Pa of the conduit 10 toward the second end Pb of the conduit 10. Next, the operator closes the predetermined position in the conduit 10 using the stop valve 22. Next, the operator conducts the airtightness test in the section from the second end Pb of the conduit 10 to the predetermined position in the conduit 10, and determines whether or not airtightness can be confirmed in this section. Note that although the operator may gradually push the stop valve 22 forward from the first end Pa of the conduit 10 and conduct the airtightness test, if, for example, a hole or the like in the conduit 10 can be clearly confirmed, the airtightness test may be conducted after pushing the stop valve 22 forward at a time to a position beyond the hole portion in the conduit 10.

If, for example, the operator determines that airtightness cannot be confirmed in the section from the second end Pb of the conduit 10 to a position Py1 in the conduit 10, the operator moves the stop valve 22 from the position Py1 in the conduit 10 to a position Py2 in the conduit 10 while pushing the rod 30 from the first end Pa of the conduit 10 toward the second end Pb of the conduit 10. Next, the operator closes the position Py2 in the conduit 10 using the stop valve 22. Next, the operator conducts the airtightness test in the section from the second end Pb of the conduit 10 to the position Py2 in the conduit 10, and determines whether or not airtightness can be confirmed in this section. The operator repeatedly moves the stop valve 22 and conducts the airtightness test until it is determined that airtightness can be confirmed in a section from the second end Pb of the conduit 10 to a predetermined position in the conduit 10.

If, for example, the operator determines that airtightness can be confirmed in the section from the second end Pb of the conduit 10 to the position P2 in the conduit 10, the operator measures the distance D2 from the second end Pb of the conduit 10 to the position P2 in the conduit 10. Next, the operator determines the position P2 that is distant from the second end Pb of the conduit 10 by the distance D2 as a position at which airtightness can be confirmed. That is to say, the operator specifies, as a normal section of the conduit 10, the section from the second end Pb of the conduit 10 to the position P2 in the conduit 10 that corresponds to the distance D2, as indicated by a hatched portion in FIG. 1B. Next, the operator removes the stop valve 22 from the first end Pa of the conduit 10.

As described above, the operator temporarily opens or closes a predetermined position in the conduit 10 and repeats the airtightness test while moving the stop valve 22 from the first end Pa of the conduit 10 toward the second end Pb of the conduit 10, and accurately specifies the normal section of the conduit 10. Note that processing in step S1 and processing in step S2 may be performed in reverse order.

Figure 1C:
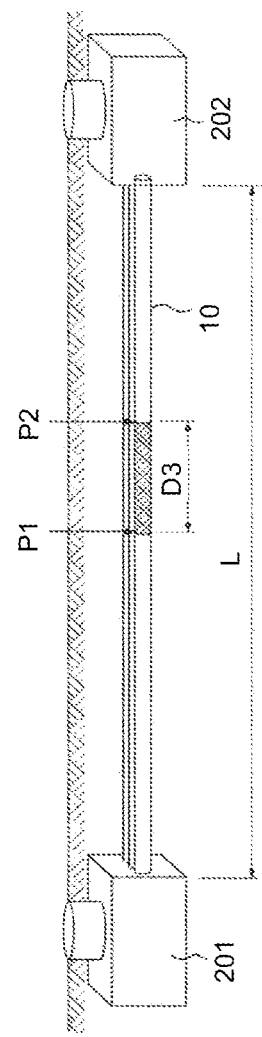
FIG. 1C is a diagram showing an example of a conceptual diagram of the conduit inspection method according to an embodiment.

Step S3: As shown in FIG. 1C, the operator specifies, as an abnormal section (a section that needs to be repaired) of the conduit 10, a section from the position P1 in the conduit 10 to the position P2 in the conduit 10 that cannot be specified as a normal section of the conduit 10.

Specifically, the operator calculates the distance D3 (=L−D1−D2) between the position P1 in the conduit 10 and the position P2 in the conduit 10, based on the distance D1 from the first end Pa of the conduit 10 to the position P1 in the conduit 10 that is measured in step S1, the distance D2 from the second end Pb of the conduit 10 to the position P2 of the conduit 10 that is measured in step S2, and the distance L (the length of the entire conduit 10) between the manhole 201 and the manhole 202. Next, the operator specifies, as an abnormal section of the conduit 10, the section from the position P1 in the conduit 10 to the position P2 in the conduit 10 that corresponds to the distance D3 between the position P1 in the conduit 10 and the position P2 in the conduit 10.

As described above, the operator specifies the section from the first end Pa of the conduit 10 to the position P1 in the conduit 10 as a normal section of the conduit 10, specifies the section from the second end Pb of the conduit 10 to the position P2 in the conduit 10 as a normal section of the conduit 10, and thereafter specifies a section excluding these normal sections as an abnormal section of the conduit 10. Thus, the operator can simply and accurately specify a section in which the conduit needs to be repaired.

<Configuration of Stop Valve 22 and Rod 30>

Figure 2:
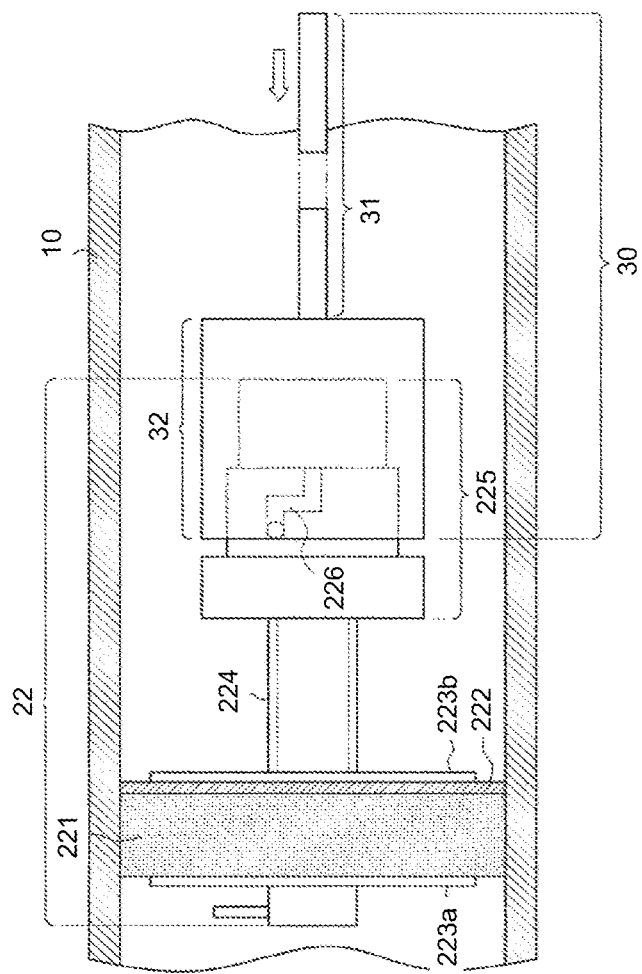
FIG. 2 is a diagram showing an example of a configuration of a stop valve and a rod according to an embodiment.

An example of a configuration of the stop valve 22 and the rod 30 will be described with reference to FIGS. 2 to 4.

The stop valve 22 includes an expanding member 221, a deformation member 222, fixing members 223 (223a and 223b), a screw portion 224, and a joint portion (first joint portion) 225. The rod 30 includes a rod portion 31 and a joint portion (second joint portion) 32.

The expanding member 221 is in contact with the deformation member 222, and is sandwiched from two sides by the fixing members 223a and 223b via the deformation member 222. The expanding member 221 expands and contracts in the radial direction of the conduit 10. The expanding member 221 is compressed when the rod portion 31 is rotated clockwise and the screw portion 224 is tightened by the operator, and expands outward in the radial direction of the conduit 10. The expanding member 221 is stretched when the rod portion 31 is rotated counterclockwise and the screw portion 224 is loosened by the operator, and contracts inward in the radial direction of the conduit 10.

The expanding member 221 is preferably made of an elastic material, and is made of a rubber material, for example. Examples of the rubber material include EPDM (ethylene-propylene rubber), CR (chloroprene rubber), CSM (chlorosulfonated polyethylene), SBR (styrene-butadiene rubber), NBR (acrylonitrile butadiene rubber), silicone rubber, or the like.

The deformation member 222 is in contact with the expanding member 221, and is sandwiched from two sides by the fixing members 223a and 223b via the expanding member 221. As shown in FIGS. 2 and 4, the deformation member 222 is configured to be in contact with an inner wall face of the conduit 10 when the expanding member 221 in contact with the deformation member 222 is contracted and also when the expanding member 221 in contact with the deformation member 222 is expanded. That is to say, the deformation member 222 is configured to have a diameter that is larger than or equal to the diameter of the conduit 10. Since the deformation member 222 is configured to have a diameter that is larger than or equal to the diameter of the conduit 10, when the operator tightens or loosens the screw portion 224, the stop valve 22 itself can be prevented from rotating together therewith. Further, since the deformation member 222 can be constantly brought into contact with the inner wall face of the conduit 10 even if the diameter of the conduit 10 changes within the conduit 10, the operator can temporarily close or open the conduit 10 at a desired position using the stop valve 22 regardless of the diameter of the conduit 10.

The deformation member 222 is preferably made of a material that has frictional resistance, and is made of, for example, a rubber material, a resin material, or the like. The rubber material may be the same material as that of the expanding member 221, for example. Examples of the resin material include polyester, polyethylene terephthalate, polyethersulfone, polyetherketone, polysulfone, polyimide, polyimideamide, polyamide, or the like.

Note that the deformation member 222 may be formed separately from the expanding member 221, or may be integrally configured with the expanding member 221. If the deformation member 222 and the expanding member 221 are integrally configured, for example, the deformation member 222 may be made of a rubber material with a protrusion, or the like.

The fixing members 223a and 223b sandwich the expanding member 221 and the deformation member 222 from two sides. When the operator rotates the rod portion 31 clockwise and tightens the screw portion 224, the fixing members 223 compress the expanding member 221 in a direction perpendicular to the radial direction of the conduit 10, and expands the expanding member 221 outward in the radial direction of the conduit 10. When the operator rotates the rod portion 31 counterclockwise and loosens the screw portion 224, the fixing members 223 stretch the expanding member 221 in the direction perpendicular to the radial direction of the conduit 10, and contracts the expanding member 221 inward in the radial direction of the conduit 10.

The screw portion 224 is provided at the center of the stop valve 22 and is configured such that the screw axis coincides with the rotation axis of the rod 30. One end of the screw portion 224 is joined to the fixing members 223, and the other end is joined to the joint portion 225. When the operator rotates the rod 30 clockwise, the screw portion 224 rotates clockwise in conjunction with the rotation of the rod 30 and is fastened to press the fixing member 223b. When the operator rotates the rod 30 counterclockwise, the screw portion 224 rotates counterclockwise in conjunction with the rotation of the rod 30 and is loosened.

As shown in FIG. 3, the joint portion 225 has a groove portion 226, the joint portion 32 has a protruding portion 33, and the groove portion 226 and the protruding portion 33 are configured to fit to each other. The stop valve 22 engages with the rod 30 due to the groove portion 226 of the joint portion 225 and the protruding portion 33 of the joint portion 32 meshing with and fixed to each other. As a result, the screw portion 224 can rotate clockwise or counterclockwise in conjunction with the rotation of the rod 30. The joint portion 225 and the joint portion 32 engage with each other to constitute a joint member. The screw portion 224 can press the fixing member 223b by rotating in conjunction with the rotation of the joint member. Further, the operator can move the stop valve 22 in any manner within the conduit 10 by pushing the rod 30 attached to the stop valve 22 from the second end Pb of the conduit 10 toward the first end Pa of the conduit 10, or from the first end Pa of the conduit 10 toward the second end Pb of the conduit 10.

The rod portion 31 is formed as a result of the operator connecting a plurality of bars. For example, the operator changes the number of bars connected in proportion to the distance that the stop valve 22 is inserted from the second end Pb of the conduit 10 toward the first end Pa of the conduit 10 as shown in FIG. 1A. When the distance that the stop valve 22 is inserted from the second end Pb of the conduit 10 toward the first end Pa of the conduit 10 is increased, the operator increases the number of bars connected while pushing the stop valve 22 forward using the rod portion 31 and gradually lengthens the rod portion 31. For example, the operator changes the number of bars connected in proportion to the distance that the stop valve 22 is inserted from the first end Pa of the conduit 10 toward the second end Pb of the conduit 10 as shown in FIG. 1B. When the distance that the stop valve 22 is inserted from the first end Pa of the conduit 10 toward the second end Pb of the conduit 10 is increased, the operator increases the number of bars connected while pushing the stop valve 22 forward using the rod portion 31, and gradually lengthens the rod portion 31.

When the rod portion 31 is constituted by a plurality of bars, the rod 30 more readily bend than when the rod portion 31 is constituted by a single bar. As a result, even if the conduit 10 curves, the operator can insert the rod 30 deeper in the conduit 10 in accordance with the curve of the conduit 10, and thus, the operator can smoothly move the stop valve 22 engaged with the rod 30 to a desired position in the conduit 10 and temporarily close or open this position.

<Example of Method for Attaching Rod to Stop Valve>

An example of a method for attaching the rod 30 to the stop valve 22 will be described with reference to FIGS. 3A to 3D.

Figure 3A:
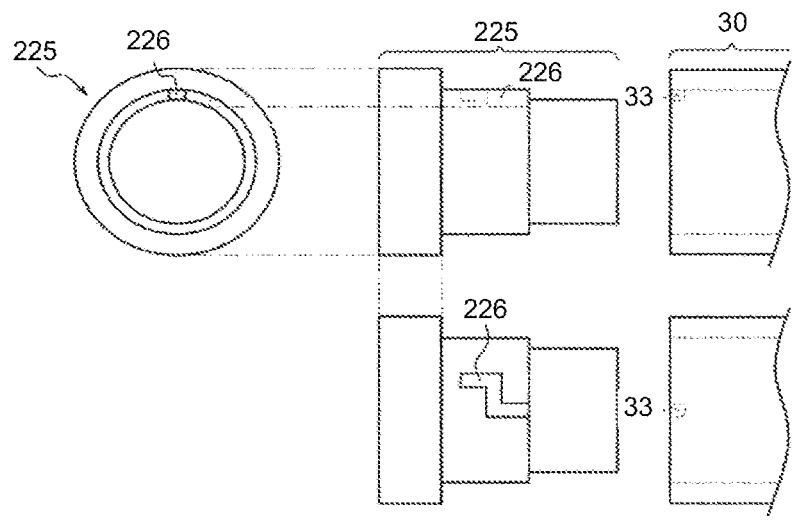
FIG. 3A is a diagram showing an example of a method for attaching the rod to the stop valve.

As shown in FIG. 3A, the joint portion 225 of the stop valve 22 has the groove portion 226, and the joint portion 32 of the rod 30 has the protruding portion 33. The operator positions the stop valve 22 and the rod 30 such that the groove portion 226 of the joint portion 225 meshes with the protruding portion 33 of the joint portion 32.

Figure 3B:
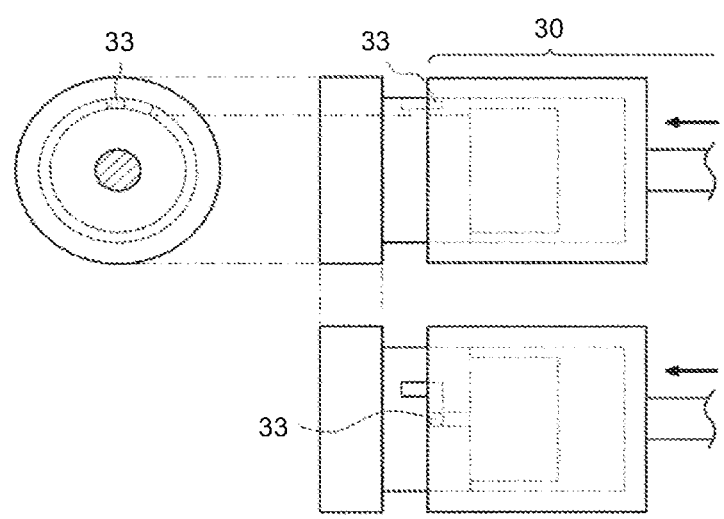
FIG. 3B is a diagram showing an example of a method for attaching the rod to the stop valve.

As shown in FIG. 3B, the operator pushes the rod 30 in an arrow direction to mesh the groove portion 226 of the joint portion 225 with the protruding portion 33 of the joint portion 32, and moves the protruding portion 33 of the joint portion 32 to a position at which the rod 30 no longer moves in the arrow direction.

Figure 3C:
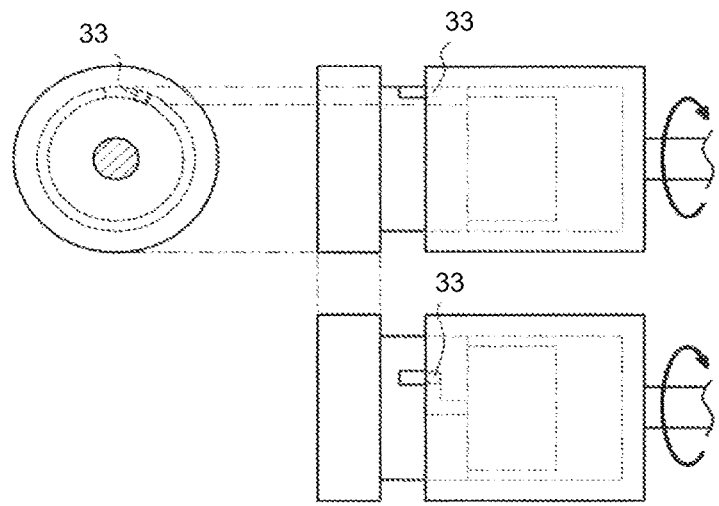
FIG. 3C is a diagram showing an example of a method for attaching the rod to the stop valve.

As shown in FIG. 3C, the operator rotates the rod 30 in the arrow direction to mesh the groove portion 226 of the joint portion 225 with the protruding portion 33 of the joint portion 32, and moves the protruding portion 33 of the joint portion 32 to a position at which the rod 30 no longer moves in the arrow direction.

Figure 3D:
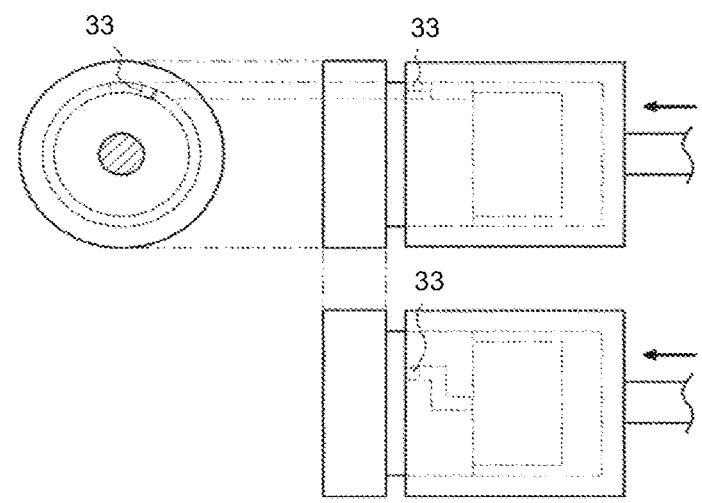
FIG. 3D is a diagram showing an example of a method for attaching the rod to the stop valve.

As shown in FIG. 3D, the operator pushes the rod 30 in the arrow direction to mesh the groove portion 226 of the joint portion 225 with the protruding portion 33 of the joint portion 32, and moves the protruding portion 33 of the joint portion 32 to a position at which the rod 30 no longer moves in the arrow direction. The rod 30 is thus attached to the stop valve 22.

<Example of Method for Temporarily Closing or Opening Conduit 10 at Predetermined Position>

An example of a method for temporarily closing or opening the conduit 10 at a predetermined position will be described with reference to FIGS. 4A to 4D.

Figure 4A:
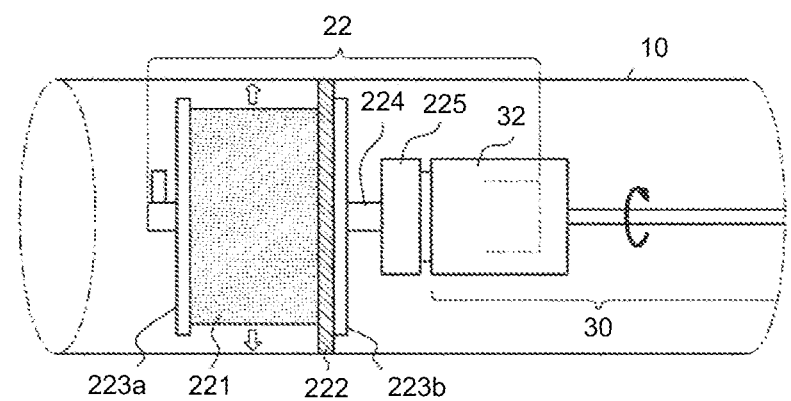
FIG. 4A is a diagram showing an example of a method for temporarily closing or opening a conduit at a predetermined position.

As shown in FIG. 4A, the operator rotates the rod 30 in the direction of a black arrow (clockwise) and fastens the screw portion 224. Thus, the expanding member 221 is compressed in a direction perpendicular to the radial direction of the conduit 10 and expands in the direction of white arrows.

Figure 4B:
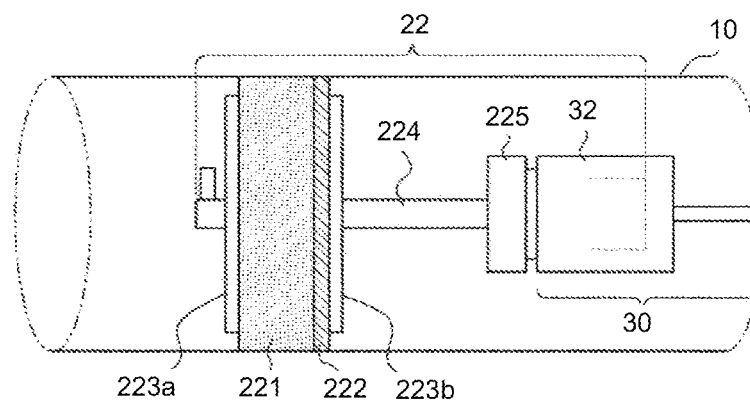
FIG. 4B is a diagram showing an example of a method for temporarily closing or opening a conduit at a predetermined position.

As shown in FIG. 4B, the expanding member 221 comes into intimate contact with the inner wall face of the conduit 10. The deformation member 222 is fixed in contact with the inner wall face 10 at a predetermined position in the conduit 10. Thus, the stop valve 22 temporarily closes the predetermined position in the conduit 10.

Figure 4C:
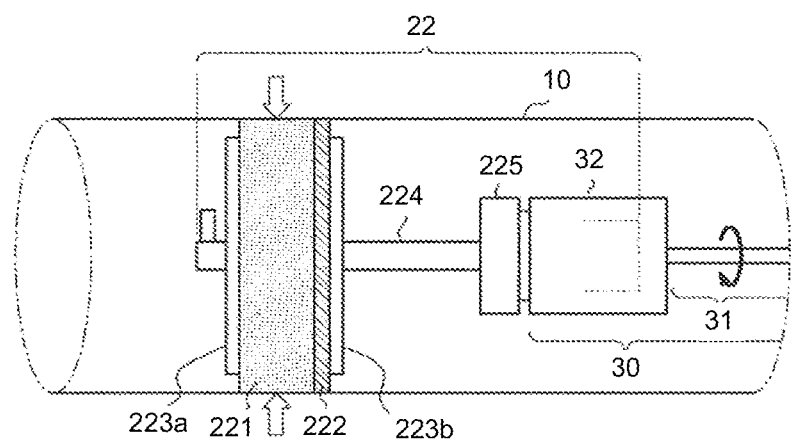
FIG. 4C is a diagram showing an example of a method for temporarily closing or opening a conduit at a predetermined position.

As shown in FIG. 4C, the operator rotates the rod 30 in the direction of the black arrow (counterclockwise) and loosens the screw portion 224. Thus, the expanding member 221 stretches in the direction perpendicular to the radial direction of the conduit 10 and contracts in the direction of the white arrows.

Figure 4D:
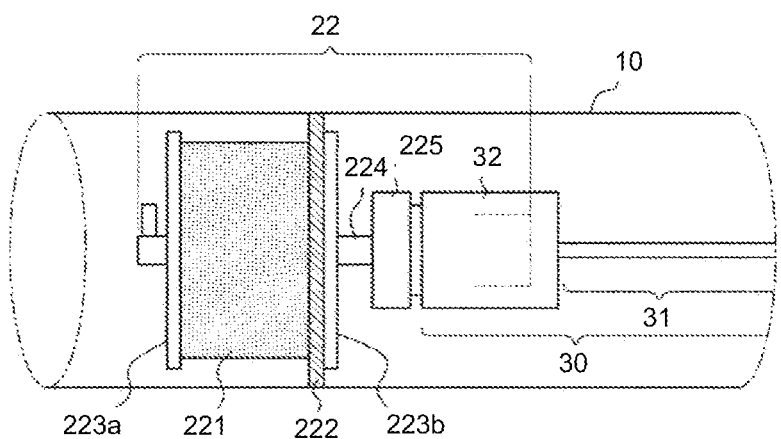
FIG. 4D is a diagram showing an example of a method for temporarily closing or opening a conduit at a predetermined position.

As shown in FIG. 4D, the expanding member 221 detaches from the inner wall face of the conduit 10. The deformation member 222 can then move within the conduit 10 in a state of being in contact with the inner wall face of the conduit 10. Thus, the stop valve 22 temporarily opens the predetermined position in the conduit 10.

Note that, as shown in FIG. 4, the deformation member 222 needs to be configured to have a diameter that is at least equal to the diameter of the conduit 10. If the diameter of the deformation member 222 is smaller than the diameter of the conduit 10, the stop valve 22 rotates together when the operator fastens or loosens the screw portion 224. To prevent the stop valve 22 from thus rotating together, for example, a means is also conceivable in which a bearing is attached to the screw portion 224 and the operator fastens or loosens the screw portion 224 with a force smaller than the force by which the stop valve 22 itself rotates, or in which the diameter of the stop valve 22 is made equal to the diameter of the conduit 10. However, by using the stop valve 22 that includes the deformation member 222 with a diameter that is at least equal to the diameter of the conduit 10, the operator can accurately close or open the conduit 10 at a desired position while preventing the stop valve 22 from rotating together, using a simple and inexpensive means.

<Flowchart>

Figure 5:
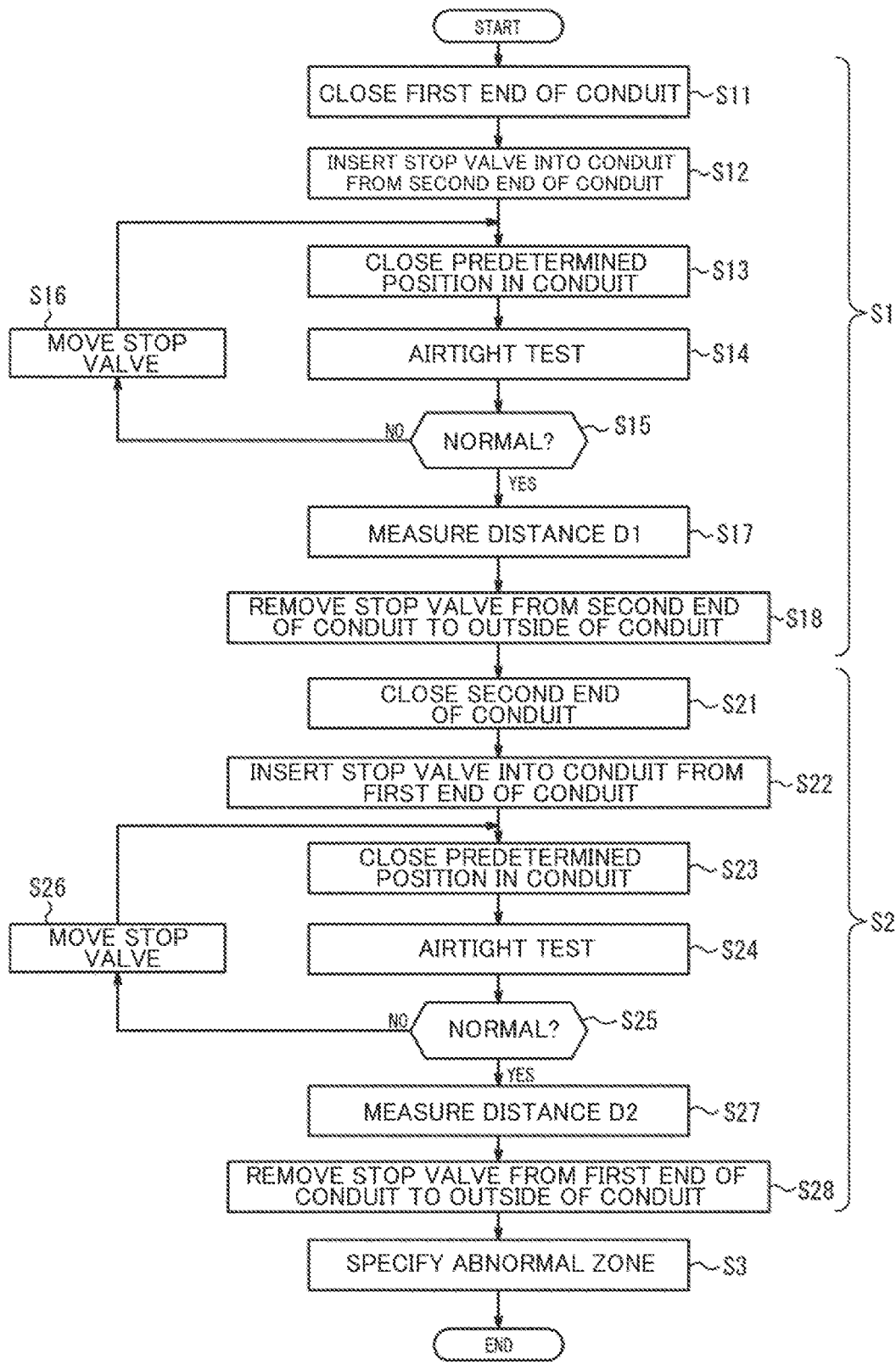
FIG. 5 is a flowchart showing an example of the conduit inspection method according to an embodiment.

An example of the conduit inspection method according to an embodiment of the present invention will be described in detail with reference to FIG. 5.

The conduit inspection method according to the present embodiment includes the first specifying step (step S1), the second specifying step (step S2), and the specifying step (step S3).

Step S1 includes a closing step (step S11), an insertion step (step S12), a closing step (step S13), a conducting step (step S14), a determining step (step S15), a moving step (step S16), a measuring step (step S17), and a removing step (step S18).

Step S2 includes a closing step (step S21), an insertion step (step S22), a closing step (step S23), a conducting step (step S24), a determining step (step S25), a moving step (step S26), a measuring step (step S27), and a removing step (step S28).

Closing step S11: The operator closes the first end Pa of the conduit 10 that is connected to the manhole 201, using the stop valve 21.

Insertion step S12: The operator inserts the stop valve 22 into the conduit 10 from the second end Pb of the conduit 10.

Closing step S13: The operator closes the predetermined position in the conduit 10 using the stop valve 22. That is to say, the operator fastens the screw portion 224 by rotating the rod 30 clockwise, expands the expanding member 221 outward in the radial direction of the conduit 10, and brings the expanding member 221 into intimate contact with the inner wall face of the conduit 10.

Conducting step S14: The operator conducts the airtightness test in the section from the first end Pa of the conduit 10 to the predetermined position in the conduit 10.

In the airtightness test, for example, water is fed into the section from the first end Pa of the conduit 10 to the predetermined position in the conduit 10, air is released from the inside of the section to the outside of the conduit 10, and the feeding of water is stopped when the inside of the section is filled with water. The airtightness test may be a test in which the pressure within the section that is closed at two ends and filled with water is increased, and thereafter a pressure value within this section when the increasing of the pressure ends and a pressure value within the section when a predetermined time elapses are measured and compared, thereby checking the airtightness level (see FIG. 6).

The airtightness test may be a test in which, for example, a section from the first end Pa of the conduit 10 to the predetermined position in the conduit 10 is closed at two ends, the pressure within the section that is closed at the two ends and filled with air is increased, and thereafter a pressure value within the section when the increasing of the pressure ends and a pressure value within the section when a predetermined time elapses are measured and compared, thereby checking the airtightness level.

determining step S15: The operator determines whether or not the section from the first end Pa of the conduit 10 to the predetermined position in the conduit 10 is normal, that is, whether or not the airtightness can be confirmed in the section from the first end Pa of the conduit 10 to the predetermined position in the conduit 10.

If the operator determines that there is an abnormality in the section from the first end Pa of the conduit 10 to the predetermined position in the conduit 10 (step S15→NO), that is, if the operator determines that airtightness cannot be confirmed in the section from the first end Pa of the conduit 10 to the predetermined position in the conduit 10, processing in step S16 is performed.

If the operator determines that there is no abnormality in the section from the first end Pa of the conduit 10 to the predetermined position in the conduit 10 (step S15→YES), that is, if the operator determines that airtightness can be confirmed in the section from the first end Pa of the conduit 10 to the predetermined position in the conduit 10, processing in step S17 is performed.

Moving step S16: The operator opens the predetermined position in the conduit 10 using the stop valve 22. That is to say, the operator loosens the screw portion 224 by rotating the rod 30 counterclockwise, contracts the expanding member 221 inward in the radial direction of the conduit 10, and detaches the expanding member 221 from the inner wall face of the conduit 10. Then, the operator moves the stop valve 22 from the predetermined position in the conduit 10 toward the distal side of the conduit 10 while pushing the rod 30 from the second end Pb of the conduit 10 toward the first end Pa of the conduit 10. The operator repeats processing in steps S13 to S16 until the position in the conduit 10 at which airtightness can be confirmed is determined.

Measuring step S17: The operator measures the distance from the first end Pa of the conduit 10 to the position in the conduit 10 at which airtightness can be confirmed. For example, the operator measures the distance D1 from the first end Pa of the conduit 10 to the position P1 in the conduit 10, and specifies, as a normal section of the conduit 10, the section corresponding to the distance D1 from the first end Pa of the conduit 10 to the position P1 in the conduit 10 at which airtightness can be confirmed.

Removing step S18: The operator removes the stop valve 22 from the second end Pb of the conduit 10 to the outside of the conduit 10. By specifying the normal section of the conduit 10 using the above method, the operator can more accurately specify the normal section of the conduit 10 than in the case of inspecting a conduit using a pipe camera.

Closing step S21: The operator closes the second end Pb of the conduit 10 that is connected to the manhole 202, using the stop valve 21.

Insertion step S22: The operator inserts the stop valve 22 into the conduit 10 from the first end Pa of the conduit 10.

Closing step S23: The operator closes the predetermined position in the conduit 10 using the stop valve 22. That is to say, the operator fastens the screw portion 224 by rotating the rod 30 clockwise, expands the expanding member 221 outward in the radial direction of the conduit 10, and brings the expanding member 221 into intimate contact with the inner wall face of the conduit 10.

Conducting step S24: The operator conducts the airtightness test in a section from the second end Pb of the conduit 10 to a predetermined position in the conduit 10.

In the airtightness test, for example, water is fed into the section from the second end Pb of the conduit 10 to the predetermined position in the conduit 10, air is released from the inside of the section to the outside of the conduit 10, and the feeding of water is stopped when the inside of the section is filled with water. The airtightness test may be a test in which the pressure within the section that is closed at two ends and filled with water is increased, and thereafter a pressure value within this section when the increasing of the pressure ends and a pressure value within the section when a predetermined time elapses are measured and compared, thereby checking the airtightness level (see FIG. 6).

The airtightness test may be a test in which, for example, the section from the second end Pb of the conduit 10 to the predetermined position in the conduit 10 is closed at two ends, the pressure within the section that is closed at the two ends and filled with air is increased, and thereafter a pressure value within the section when the increasing of the pressure ends and a pressure value within the section when a predetermined time elapses are measured and compared, thereby checking the airtightness level.

Determining step S25: The operator determines whether or not the section from the second end Pb of the conduit 10 to the predetermined position in the conduit 10 is normal, that is, whether or not airtightness can be confirmed in the section from the second end Pb of the conduit 10 to the predetermined position in the conduit 10.

If the operator determines that there is an abnormality in the section from the second end Pb of the conduit 10 to the predetermined position in the conduit 10 (step S25→NO), that is, if the operator determines that airtightness cannot be confirmed in the section from the second end Pb of the conduit 10 to the predetermined position in the conduit 10, processing in step S26 is performed.

If the operator determines that there is no abnormality in the section from the second end Pb of the conduit 10 to the predetermined position in the conduit 10 (step S25→YES), that is, if the operator determines that airtightness can be confirmed in the section from the second end Pb of the conduit 10 to the predetermined position in the conduit 10, processing in step S27 is performed.

Moving step S26: The operator closes the predetermined position in the conduit 10 using the stop valve 22. That is to say, the operator loosens the screw portion 224 by rotating the rod 30 counterclockwise, contracts the expanding member 221 inward in the radial direction of the conduit 10, and detaches the expanding member 221 from the inner wall face of the conduit 10. Then, the operator moves the stop valve 22 from the predetermined position in the conduit 10 toward the distal side of the conduit 10 while pushing the rod 30 from the first end Pa of the conduit 10 toward the second end Pb of the conduit 10. The operator repeats processing in steps S23 to S26 until the position in the conduit 10 at which airtightness can be confirmed is determined.

Measuring step S27: The operator measures the distance from the second end Pb of the conduit 10 to a position in the conduit 10 at which airtightness can be confirmed. For example, the operator measures the distance D2 from the second end Pb of the conduit 10 to the position P2 in the conduit 10, and specifies, as a normal section of the conduit 10, the section corresponding to the distance D2 from the second end Pb of the conduit 10 to the position P2 in the conduit 10 at which airtightness can be confirmed.

Removing step S28: The operator removes the stop valve 22 from the first end Pa of the conduit 10 to the outside of the conduit 10. By specifying the normal section of the conduit 10 using the above method, the operator can more accurately specify the normal section of the conduit 10 than in the case of inspecting a conduit using a pipe camera.

Step S3: The operator specifies an abnormal section of the conduit 10. For example, the operator calculates the distance D3 between the position P1 in the conduit 10 at which airtightness can be confirmed from the first end Pa of the conduit 10 that is connected to the manhole 201, and the position P2 in the conduit 10 at which airtightness can be confirmed from the second end Pb of the conduit 10 that is connected to the manhole 202, and specifies a section corresponding to the distance D3 from the position P1 in the conduit 10 to the position P2 in the conduit 10 as an abnormal section of the conduit 10. By specifying the abnormal section of the conduit 10 using the above method, the operator can simply and accurately specify a section in an abnormality of the conduit has occurred that cannot be confirmed in an image captured by a pipe camera.

The conduit inspection method according to the present embodiment includes the first specifying step of specifying, as a normal section of the conduit 10, a section from the first end of the conduit 10 that is connected to the manhole 201 to the position P1 in the conduit 10 at which airtightness can be confirmed, the second specifying step of specifying, as a normal section of the conduit 10, a section from the second end of the conduit 10 that is connected to the manhole 202 to the position P2 in the conduit 10 at which airtightness can be confirmed, and the third specifying step of specifying a section from the position P1 to the position P2 as an abnormal section of the conduit 10. It is thus possible to simply and accurately specify a section in which the conduit 10 needs to be repaired.

Since the operator can specify a minimum section in which the conduit 10 needs to be repaired by applying the conduit inspection method according to the present embodiment to conduit maintenance, the entire conduit does not have to be repaired, and the conduit 10 can be repaired inexpensively and efficiently.

Example of Airtightness Test

An example of the airtightness test according to an embodiment of the present disclosure will be described with reference to FIG. 6.

Figure 6:
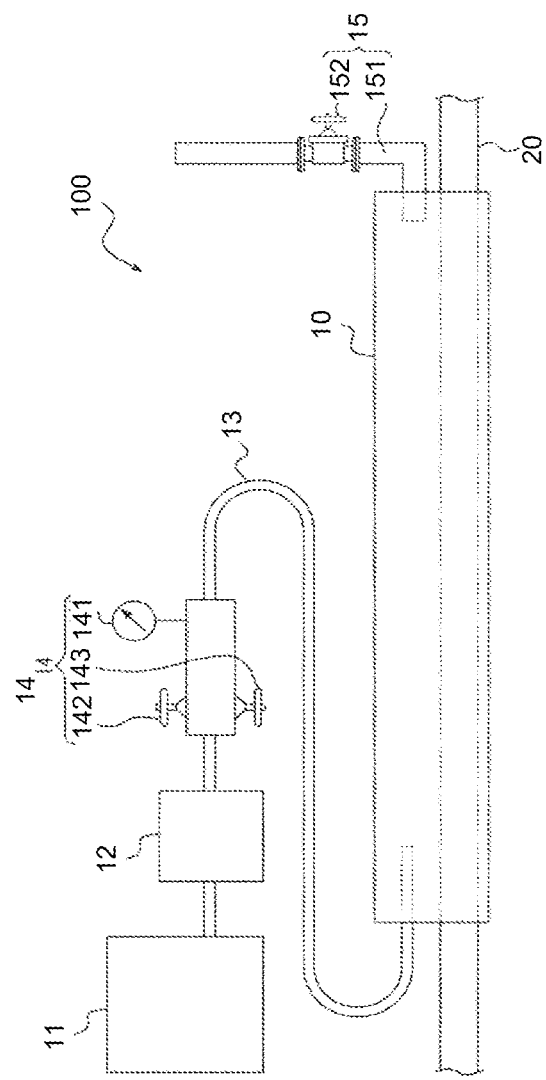
FIG. 6 is a diagram showing an example of an airtightness test according to an embodiment.
Figure 7:
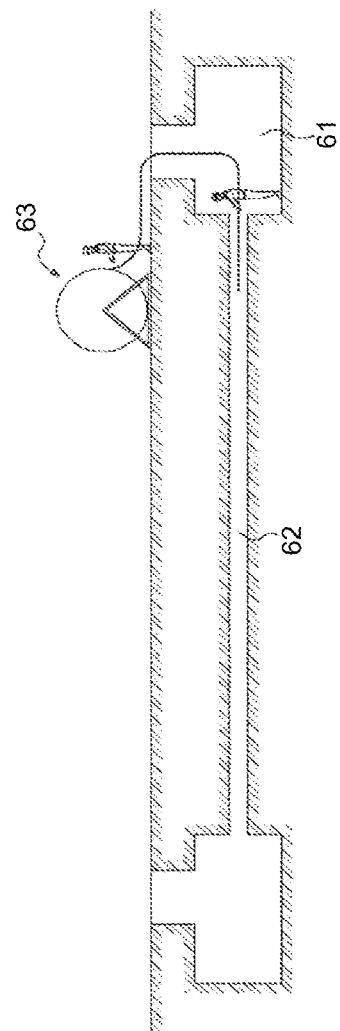
FIG. 7 is a diagram showing an example of a conventional conduit inspection method.

For example, the operator conducts the airtightness test in a predetermined section of the conduit 10 (e.g., the section from the first end of the conduit 10 to the position P1 in the conduit 10, the section from the second end of the conduit 10 to the position P2 in the conduit 10 etc.), using an airtightness test device 100 such as that shown in FIG. 6. The airtightness test device 100 is, for example, a device for conducting the airtightness test for the conduit 10 in which a cable 20 is accommodated.

As shown in FIG. 6, the airtightness test device 100 includes a tank 11, a pump 12, a hose 13, a pressure measurement device 14, and an air release portion 15. The pressure measurement device 14 includes a pressure gauge (pressure measurement portion) 141, a water feeding valve 142, and a drain valve 143. The air release portion 15 includes an air release tube 151 and a valve 152. A water feeding portion is constituted by, for example, the tank 11, the pump 12, the hose 13, the water feeding valve 142, and so on. A pressure applying portion is constituted by, for example, the tank 11, the pump 12, the hose 13, the pressure gauge 141, the water feeding valve 142, the air release portion 15, and so on.

The tank 11 stores water supplied from a water source or the like that is provided outside, and supplies the stored water into the conduit 10. The tank 11 at least stores an amount of water that can fill the inside of the conduit 10. The tank 11 is connected to the pump 12 via the hose 13.

The pump 12 is connected to the tank 11 and the conduit 10 via the hose 13. The pump 12 is provided between the tank 11 and the conduit 10, and is configured to be able to feed water from the tank 11 into the conduit 10 via the hose 13. The pump 12 starts feeding water from the tank 11 into the conduit 10 when the water feeding valve 142 is opened, and stops feeding water from the tank 11 into the conduit 10 when the water feeding valve 142 is closed. The pump 12 may be manually operated by the operator, or may be automatically operated by a control device or the like.

The hose 13 is provided at the first end of the conduit 10 on the upstream side and closes the first end of the conduit 10. The hose 13 is connected to the tank 11, the pump 12, and the pressure measurement device 14, connects the tank 11 and the pump 12 to each other, connects the pump 12 and the pressure measurement device 14 to each other, and connects the pressure measurement device 14 and the conduit 10 to each other. A flexible hose is employed as the hose 13, for example.

The water feeding portion is constituted by, for example, the tank 11, the pump 12, the hose 13, the water feeding valve 142, and so on. The water feeding portion opens the water feeding valve 142, drives the pump 12, and feeds water from the tank 11 into the conduit 10 via the hose 13. As a result of the water feeding portion continuing to feed water into the conduit 10, water is gradually collected within the conduit 10. The water feeding portion continues to feed water into the conduit 10 until water that does not contain air is discharged from the air release tube 151. When water that does not contain air is discharged from the air release tube 151, the inside of the conduit 10 is filled with water fed by the water feeding portion.

The air release portion 15 includes the air release tube 151 and the valve 152. The air release portion 15 is provided at the second end of the conduit 10 on the downstream side, and discharges air that has flown into the conduit 10, from the inside of the conduit 10 to the outside of the conduit 10.

One end of the air release tube 151 is connected to the second end of the conduit 10 on the downstream side, and the other end of the air release tube 151 is open to the outside. When it is confirmed that water that does not contain air is discharged from the air release tube 151, the operator can determine that the inside of the conduit 10 is filled with water. Also, when it is confirmed that water that contains air is discharged from the air release tube 151, the operator can determine that air and water mix within the conduit 10. That is to say, the operator can determine whether or not the inside of the conduit 10 is filled with water by checking whether water that does not contain air is discharged from the air release tube 151 or water that contains water is discharged from the air release tube 151.

The valve 152 is provided at an intermediate portion of the air release tube 151, and controls opening or closing of the second end of the conduit 10 on the downstream side. The second end of the conduit 10 opens when the valve 152 opens, and the second end of the conduit 10 closes when the valve 152 closes. The water feeding portion continues to feed water into the conduit 10, and when the valve 152 closes after water that does not contain air is discharged from the air release tube 151, the inside of the conduit 10 is in a state of being filled with water with two ends closed.

The valve 152 controls discharging of air from the inside of the conduit 10 to the outside of the conduit 10. When the water feeding portion starts feeding water into the conduit 10 with the valve 152 open, air mixed in the water within the conduit 10 is pushed toward the second end of the conduit 10 and discharged to the outside of the conduit 10. Meanwhile, even if the water feeding portion starts feeding water into the conduit 10 with the valve 152 closed, air is not discharged to the outside of the conduit 10 but remains within the conduit 10.

The pressure measurement device 14 includes the pressure gauge 141, the water feeding valve 142, and the drain valve 143. The pressure measurement device 14 is connected to the hose 13 in series and is provided between the conduit 10 and the pump 12.

The pressure gauge 141 measures a pressure value within the conduit 10. The operator can understand the pressure value within the conduit 10 by checking a tick mark indicated by the pressure gauge 141. The water feeding valve 142 controls the feeding of water into the conduit 10 or stopping the feeding of water. When the water feeding valve 142 opens and the pump 12 is driven, the feeding of water from the tank 11 into the conduit 10 starts via the hose 13. When the water feeding valve 142 closes, the feeding of water into the conduit 10 stops. The drain valve 143 controls draining of water from the inside of the conduit 10 or stopping the draining. When the drain valve 143 opens, the draining of water from the inside of the conduit 10 starts, and when the drain valve 143 is closed, the draining of water from the inside of the conduit 10 stops.

The pressure applying portion is constituted by, for example, the tank 11, the pump 12, the hose 13, the pressure gauge 141, the water feeding valve 142, the air release portion 15, and so on. As a result of the water feeding portion continuing to feed water into the conduit 10, water that does not contain air is discharged from the air release tube 151. When all air is released from the inside of the conduit 10 to the outside of the conduit 10, the pressure applying portion closes the water feeding valve 142 and stops the pump 12. Furthermore, the pressure applying portion closes the valve 152 of the air release portion 15 and closes the second end of the conduit 10 on the downstream side. Thus, the inside of the conduit 10 is in a state of being filled with water with two ends closed. In this state, the pressure applying portion opens the water feeding valve 142, drives the pump 12, and feeds water from the tank 11 into the conduit 10 via the hose 13. The pressure within the conduit 10 gradually increases as a result of the pressure applying portion continuing to feed water into the conduit 10.

The pressure applying portion continues to feed water into the conduit 10 until the pressure value within the conduit 10 that is measured by the pressure gauge 141 reaches a predetermined pressure value (e.g., 49 kPa). If the pressure value within the conduit 10 that is measured by the pressure gauge 141 reaches the predetermined pressure value, the pressure applying portion stops feeding water into the conduit 10. On the other hand, if the pressure value within the conduit 10 that is measured by the pressure gauge 141 has not reached the predetermined pressure value, the pressure applying portion continues to feed water into the conduit 10. The predetermined pressure value is any set value, but is preferably about 49 kPa considering that the typical maximum pressure resistance capacity of a communication conduit is about 98 kPa.

The operator can determine whether or not the pressure value within the conduit 10 has reached the predetermined pressure value by checking a tick mark indicated by the pressure gauge 141. If the tick mark indicated by the pressure gauge 141 is, for example, 49 kPa or more, the operator can determine that the pressure value within the conduit 10 has reached 49 kPa. If the tick mark indicated by the pressure gauge 141 is, for example, smaller than 49 kPa, the operator can determine that the pressure value within the conduit 10 has not reached 49 kPa. Note that if the pressure value within the conduit 10 does not reach the predetermined pressure value even after the pressure applying portion has continued feeding water into the conduit 10 for a long time, the pressure applying portion stops feeding water into the conduit 10. In this case, the operator can determine that there is some kind of abnormality in the conduit 10 by checking a tick mark indicated by the pressure gauge 141.

The pressure gauge 141 measures the pressure value within the conduit 10 when the increasing of the pressure ends (e.g., when the pressure value within the conduit 10 reaches 49 kPa). The pressure gauge 141 also measures a pressure value within the conduit 10 when a predetermined time elapses (e.g., when 3 minutes elapses after the pressure value within the conduit 10 reached 49 kPa).

The operator compares the pressure value within the conduit 10 when the increasing of the pressure ends with the pressure value within the conduit 10 when the predetermined time elapses, and determines whether or not the pressure value within the conduit 10 when the predetermined time elapses has dropped from the pressure value within the conduit 10 when the increasing of the pressing ends.

If the pressure value within the conduit 10 when the predetermined time elapses is lower than the pressure value within the conduit 10 when the increasing of the pressure ends, the operator determines that there is an abnormality in the conduit 10. That is to say, if the pressure value within the conduit 10 when the predetermined time elapses has dropped from the pressure value within the conduit 10 when the increasing of the pressure ends, the operator determines that there is an abnormality in the conduit 10.

If the pressure value within the conduit 10 when the predetermined time elapses is equal to the pressure value within the conduit 10 when the increasing of the pressure ends, the operator determines that there is no abnormality in the conduit 10. That is to say, if the pressure value within the conduit 10 when the predetermined time elapses has not dropped from the pressure value within the conduit 10 when the increasing of the pressure ends, the operator determines that there is no abnormality in the conduit 10. Note that "the pressure value within the conduit 10 when the predetermined time elapses being equal to the pressure value within the conduit 10 when the increasing of the pressure ends" does not mean that these pressure values are completely the same, but embraces an error within a range that is allowable in the technical field to which the present disclosure pertains. For example, if the conduit 10 is a typical communication conduit, the pressure value within the conduit 10 when the predetermined time elapses with an error within a range smaller than ±1.96 kPa is regarded as being equal to the pressure value within the conduit 10 after the increasing of the pressure ends.

By conducting the airtightness test in a predetermined section of the conduit 10 using the above-described airtightness test device 100, the operator can reliably find an abnormality in a conduit that cannot be checked in an image captured by a pipe camera. Further, the operator can determine whether or not there is an abnormality in the conduit 10 based on a quantitative index, that is, based on whether or not the pressure value within the conduit 10 when the predetermined time elapses has dropped from the pressure value within the conduit 10 when the increasing of the pressure ends. Therefore, the conventional problem that the inspection accuracy varies depending on the operator can be solved. In addition, since a space for inserting a pipe camera is not necessary, even if a thick cable or a plurality of cables bundled are accommodated in the conduit 10, the operator can accurately check the conduit 10 regardless of the diameter of the conduit 10.

<Variation>

Although the present embodiment has given a description while taking, as an example, a method in which a predetermined position of the conduit 10 is temporarily closed or opened by the stop valve 22, the method for temporarily closing or opening a predetermined position of the conduit 10 is not limited to the above-described method.

Although the above embodiment has been described as a representative example, it is apparent to those skilled in the art that many changes and substitutions can be made within the gist and scope of the present disclosure. Accordingly, the present invention should not be construed as being limited by the above embodiment, and various variations and changes can be made without departing from the claims. For example, the order of the steps described in the flowchart of the embodiment is not limited to the above and can be changed as appropriate. A plurality of steps can be combined into one, or one step can be divided.

REFERENCE SIGNS LIST

10 Conduit
11 Tank
12 Pump
13 Hose
14 Pressure measurement device
15 Air release portion
20 Cable
21, 22 Stop valve
30 Rod
31 Rod portion
32 Joint portion
33 Protruding portion
100 Airtightness test device
141 Pressure gauge (pressure measurement portion)
142 Water feeding valve
143 Drain valve
151 Air release tube
152 Valve
201, 203 Manhole
221 Expanding member
222 Deformation member
223a, 223b Fixing member
224 Screw portion
225 Joint portion
226 Groove portion

The invention claimed is:

1. A conduit inspection method for inspecting a conduit with two ends connected to respective manholes, the method comprising:
a first identification step of identifying, as a normal section of the conduit, a section from a first end of the conduit that is connected to one of the manholes to a first position in the conduit at which airtightness can be confirmed;
a second identification step of identifying, as a normal section of the conduit, a section from a second end of the conduit that is connected to another one of the manholes to a second position in the conduit at which airtightness can be confirmed; and
a third identification step of identifying a section from the first position to the second position as an abnormal section of the conduit,
wherein the first identification step includes:
a step of closing the first end of the conduit using a first stop valve;
a step of inserting a second stop valve from the second end of the conduit to a first predetermined position in the conduit;
a step of closing the first predetermined position using the second stop valve;
a step of conducting an airtightness test in a section from the first end to the first predetermined position; and
a first determining step of determining whether or not airtightness in the section can be confirmed, and
the second identification step includes:
a step of closing the second end of the conduit using the first stop valve;
a step of inserting the second stop valve from the first end of the conduit to a second predetermined position in the conduit;
a step of closing the second predetermined position using the second stop valve;
a step of conducting the airtightness test in a section from the second end to the second predetermined position; and
a second determining step of determining whether or not airtightness can be confirmed in the section,
wherein the first identification step further includes:
a step of, upon determining in the first determining step that the airtightness can be confirmed, measuring a distance from the first end to the first position, and removing the second stop valve from the second end; and a step of, upon determining in the first determining step that the airtightness cannot be confirmed, moving the second stop valve from the first predetermined position toward the first end, the second identification step further includes:

a step of, upon determining in the second determining step that the airtightness can be confirmed, measuring a distance from the second end to the second position, and removing the second stop valve from the first end; and a step of, upon determining in the second determining step that the airtightness cannot be confirmed, moving the second stop valve from the second predetermined position toward the second end, and the third identification step further includes:

a step of calculating a distance from the first position to the second position based on the distance from the first end to the first position and the distance from the second end to the second position.

2. The conduit inspection method according to claim 1, wherein the first, second, and third identification steps are performed by an operator.

3. The conduit inspection method according to claim 1, wherein the air tightness test is performed using an airtightness test device having a tank, a pump, a hose, and a pressure measurement device.

4. The conduit inspection method according to claim 3, wherein the hose of the airtightness test feeds water stored in the tank to the conduit.

5. The conduit inspection method according to claim 3, wherein the airtightness test device further includes an air release portion to release air from the conduit.

6. The conduit inspection method according to claim 1, wherein the second stop valve includes a deformation member, and the deformation member is made of a material having frictional resistance, and has a diameter larger than or equal to a diameter of the conduit.

7. The conduit inspection method according to claim 6, wherein the second stop valve further includes an expanding member that is in contact with the deformation member, and fixing members that sandwich and fix the deformation member and the expanding member, and the step of closing the first predetermined position using the second stop valve or the step of closing the second predetermined position using the second stop valve further includes an expanding step of pressing the fixing members such that the expanding member is compressed and expands outward in a radial direction of the conduit.

8. The conduit inspection method according to claim 7, wherein the expanding member is formed of a rubber material.

9. The conduit inspection method according to claim 7, wherein the second stop valve further includes a screw portion that is joined to the fixing members, and in the expanding step, the fixing members are pressed by the screw portion.

10. The conduit inspection method according to claim 9, wherein the second stop valve further includes a joint member formed by fitting a groove portion of a first joint portion and a protruding portion of a second joint portion to each other, the screw portion is joined to the first joint portion, and in the expanding step, the fixing members are pressed by rotating the screw portion in conjunction with a rotation of the joint member.

11. A conduit inspection method for inspecting a conduit with two ends connected to respective manholes, the method comprising:

a first identification step of identifying, as a normal section of the conduit, a section from a first end of the conduit that is connected to one of the manholes to a first position in the conduit at which airtightness can be confirmed;

a second identification step of identifying, as a normal section of the conduit, a section from a second end of the conduit that is connected to another one of the manholes to a second position in the conduit at which airtightness can be confirmed; and a third identification step of identifying a section from the first position to the second position as an abnormal section of the conduit, wherein the first identification step includes:

a step of closing the first end of the conduit using a first stop valve;

a step of inserting a second stop valve from the second end of the conduit to a first predetermined position in the conduit;

a step of closing the first predetermined position using the second stop valve;

a step of conducting an airtightness test in a section from the first end to the first predetermined position; and a first determining step of determining whether or not airtightness in the section can be confirmed, and the second identification step includes:

a step of closing the second end of the conduit using the first stop valve;

a step of inserting the second stop valve from the first end of the conduit to a second predetermined position in the conduit;

a step of closing the second predetermined position using the second stop valve;

a step of conducting the airtightness test in a section from the second end to the second predetermined position; and a second determining step of determining whether or not airtightness can be confirmed in the section, wherein the second stop valve includes a deformation member, and the deformation member is made of a material having frictional resistance, and has a diameter larger than or equal to a diameter of the conduit, wherein the second stop valve further includes an expanding member that is in contact with the deformation member, and fixing members that sandwich and fix the deformation member and the expanding member, and the step of closing the first predetermined position using the second stop valve or the step of closing the second predetermined position using the second stop valve further includes an expanding step of pressing the fixing members such that the expanding member is compressed and expands outward in a radial direction of the conduit, and wherein the second stop valve further includes a screw portion that is joined to the fixing members, and in the expanding step, the fixing members are pressed by the screw portion.

12. The conduit inspection method according to claim 11, wherein the first, second, and third identification steps are performed by an operator.

13. The conduit inspection method according to claim 11, wherein the expanding member is formed of a rubber material.

14. The conduit inspection method according to claim 13, wherein the rubber material includes ethylene-propylene rubber, chloroprene rubber, clorosulfonated polyethylene, styrene-butadiene rubber, acrylonitrile butadiene rubber, or silicone rubber.

15. The conduit inspection method according to claim 14, wherein the rubber material includes ethylene-propylene rubber, chloroprene rubber, clorosulfonated polyethylene, styrene-butadiene rubber, acrylonitrile butadiene rubber, or silicone rubber.

16. The conduit inspection method according to claim 11, wherein the air tightness test is performed using an airtightness test device having a tank, a pump, a hose, and a pressure measurement device.

17. The conduit inspection method according to claim 16, wherein the hose of the airtightness test feeds water stored in the tank to the conduit.

18. The conduit inspection method according to claim 17, wherein the airtightness test device further includes an air release portion to release air from the conduit.

\* \* \* \* \*